A. S. DYCKMAN.
Improvement in Covers for Fruit Baskets.
No. 121,238.　　　Fig. 1.　　　Patented Nov. 28, 1871.
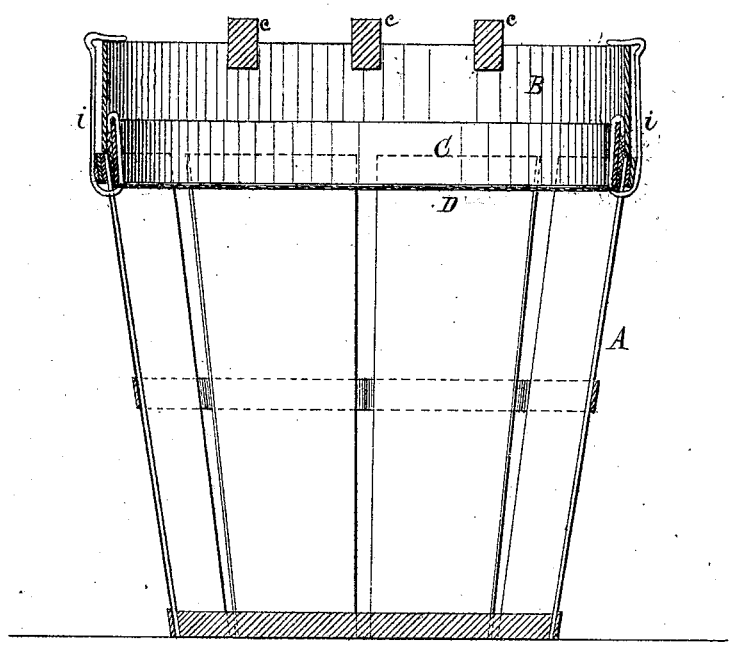
Fig. 2.
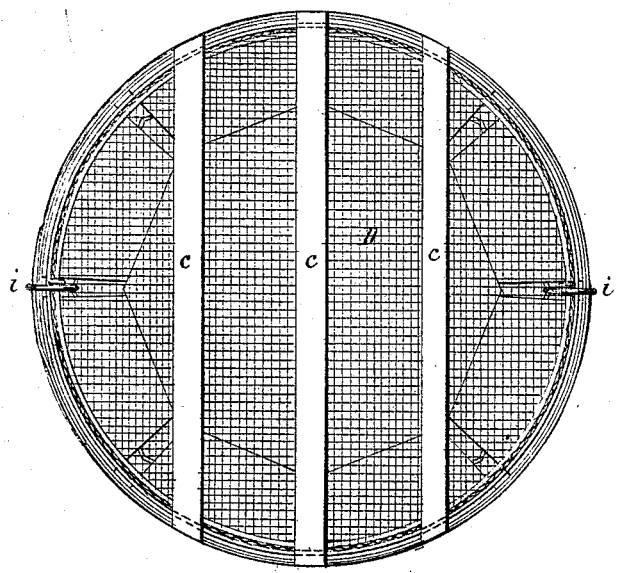
Witnesses:　　　　　　　　　　　　Inventor:
G. Mathys.　　　　　　　　　　　　A. S. Dyckman.
Amos W. Hart.
　　　　　　　　　　　　Per
　　　　　　　　　　　　　　Attorneys.

UNITED STATES PATENT OFFICE.

AARON S. DYCKMAN, OF SOUTH HAVEN, MICHIGAN.

IMPROVEMENT IN COVERS FOR FRUIT-BASKETS.

Specification forming part of Letters Patent No. 121,238, dated November 28, 1871.

*To all whom it may concern:*

Be it known that I, AARON S. DYCKMAN, of South Haven, in the county of Van Buren and State of Michigan, have invented certain Improvements in Fruit-Basket Covers; and I do hereby declare that the following is a full, clear, and exact description thereof, which will enable others skilled in the art to make and use the same, reference being had to the accompanying drawing forming part of this specification, in which—

Figure 1 represents a central longitudinal section of a fruit-basket provided with my improved cover, and Fig. 2 a plan view of the same.

The object of my invention is to provide for the use of fruit raisers, shippers, and dealers a receptacle for fruit which shall be better adapted to prevent the improper handling or abstraction of the same, and to keep off filth and insects or other vermin while allowing free access of air and convenient inspection. To this end I employ what I term a "railroad top" or cover, consisting of a hoop provided with slats across one side, and a smaller adjustable hoop, by which the cover and likewise a netting are secured to the basket top, as hereinafter described.

In the drawing, A represents a basket, made of any suitable material, but preferably having sheet-metal staves. B is the railroad top or cover, which is formed of a broad sheet-metal band or hoop, having about the same diameter as the top of the basket, and with a number of slats, c, secured to its upper edge and extending across it. To secure the cover to the basket I employ the adjustable hoop C, which is slightly less in diameter, so as to fit into the top of the basket. It also projects above the basket so that the cover A fits over it. A gauze-net, D, is secured between the basket top and the hoop C by friction. To provide an additional means of securing the hoop and cover to the basket I employ wire hooks $i$ $i$, which are bent around the hoop C, passed under the rim of the basket, and then hooked over the top of the cover B, as shown. In some cases I design making the hoop C of sufficient diameter to fit over or outside instead of inside the basket top and rest on a hoop attached thereto. The netting may likewise be secured between the two hoops, or otherwise if found preferable on any or all occasions. Two kinds or qualities of fruit may be packed in a basket provided with my improved top, one below and the other above the netting. In any case, the less the number of slats on the top of the cover the larger must be the specimens of fruit packed in the top of the basket in order to prevent abstraction of them between the slats.

Thus constructed, my cover is readily attached to and removed from the basket, is inexpensive in manufacture, occupies little space, and forms an entirely safe protection for the fruit in the basket.

Having thus described my invention, what I claim as new, and desire to secure by Letters Patent, is—

1. The improved cover, constructed of the hoop or band B, provided with cross-slats $c$, in combination with the adjustable hoop C, as and for the purpose herein described.

2. The combination of the top or cover B $c$ $c$, adjustable hoop C, and netting D with a fruit-basket, as shown and described.

3. The combination with the cover B $c$, hoop C, and hooks $i$ $i$, with a fruit-basket, as shown and described.

South Haven, August 25, 1868.

AARON S. DYCKMAN.

Witnesses:
 E. H. LOUNSBERY,
 MILTON H. RICE.